(12) United States Patent
Rofougaran

(10) Patent No.: US 8,473,771 B2
(45) Date of Patent: *Jun. 25, 2013

(54) INTEGRATED CIRCUIT HAVING FREQUENCY DEPENDENT NOISE AVOIDANCE

(71) Applicant: Broadcom Corporation, Irvine, CA (US)

(72) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,772

(22) Filed: Oct. 25, 2012

(65) Prior Publication Data

US 2013/0064334 A1    Mar. 14, 2013

Related U.S. Application Data

(63) Continuation of application No. 12/796,533, filed on Jun. 8, 2010, now Pat. No. 8,321,716, which is a continuation of application No. 11/494,147, filed on Jul. 26, 2006, now Pat. No. 7,793,132.

(51) Int. Cl.
| | |
|---|---|
| G06F 1/00 | (2006.01) |
| G06F 1/04 | (2006.01) |
| G06F 3/033 | (2006.01) |
| H03L 7/099 | (2006.01) |
| H03K 3/03 | (2006.01) |
| H03K 19/00 | (2006.01) |
| H03K 5/01 | (2006.01) |
| H03K 9/00 | (2006.01) |
| H04L 7/00 | (2006.01) |

(52) U.S. Cl.
USPC .............. 713/500; 713/600; 331/1 R; 331/46; 326/93; 327/100; 375/316; 375/354; 455/130

(58) Field of Classification Search
USPC ...... 713/500, 600; 326/93; 327/100; 331/1 R, 331/46; 375/316, 354; 455/130
See application file for complete search history.

(56) References Cited

U.S. PATENT DOCUMENTS

| | | | | |
|---|---|---|---|---|
| 6,201,431 | B1 * | 3/2001 | Allen et al. ................... | 327/379 |
| 6,850,754 | B2 * | 2/2005 | Nakano ......................... | 455/348 |
| 6,856,794 | B1 * | 2/2005 | Tso et al. ...................... | 455/260 |
| 7,181,239 | B2 * | 2/2007 | Yamamoto et al. ........ | 455/556.1 |
| 7,279,989 | B2 * | 10/2007 | Bettner et al. .................. | 331/16 |
| 7,634,028 | B2 * | 12/2009 | Crawley ........................ | 375/326 |

* cited by examiner

*Primary Examiner* — Stefan Stoynov
(74) *Attorney, Agent, or Firm* — Garlick & Markison; Holly L. Rudnick

(57) ABSTRACT

A clock source generates a first clock signal for clocking a first clocked module and a rate adapting module produces an operation dependent clock signal from the first clock signal for clocking a second clocked module that is rate dependent. The first clock signal has a rate such that frequency dependent noise components associated with the first clock signal are outside a given frequency range that causes adverse performance in the first clocked module.

20 Claims, 5 Drawing Sheets

INTEGRATED CIRCUIT HAVING FREQUENCY DEPENDENT NOISE AVOIDANCE

CROSS REFERENCE TO RELATED PATENTS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility Application Ser. No. 12/796,533, entitled "INTEGRATED CIRCUIT HAVING FREQUENCY DEPENDENT NOISE AVOIDANCE," filed Jun. 8, 2010, now U.S. Pat. No. 8,321,716; which claims priority pursuant to 35 U.S.C. § 120, as a continuation, to the following U.S. Utility Patent Application, which is incorporated herein by reference in its entirety and made part of the present U.S. Utility Patent Application for all purposes:
   A. U.S. Utility application Ser. No. 11/494,147, entitled "INTEGRATED CIRCUIT HAVING FREQUENCY DEPENDENT NOISE AVOIDANCE," filed Jul. 26, 2006, now U.S. Pat. No. 7,793,132.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to integrated circuits and more particularly to noise avoidance within integrated circuits.

2. Description of Related Art

As is known, integrated circuits are used in a wide variety of products including, but certainly not limited to, portable electronic devices, computers, computer networking equipment, home entertainment, automotive controls and features, and home appliances. As is also known, integrated circuits include a plurality of circuits in a very small space to perform one or more fixed or programmable functions.

Many integrated circuits include circuitry that is sensitive to noise and circuitry that produces noise. For example, a radio frequency integrated circuit (RFIC), which may be used in a cellular telephone, wireless local area network (WLAN) interface, broadcast radio receiver, two-way radio, etc., includes a low noise amplifier (LNA) that is susceptible to adverse performance due to noise and also includes an analog to digital converter and other digital circuitry that produce noise. To prevent the noise from adversely affecting the noise sensitive circuits (e.g., the LNA) many noise reduction concepts have been developed.

The simplest noise reduction concept is to put noise sensitive circuits on a different IC die than noise producing circuits. While this solves the noise sensitivity issue, it does not provide the reduction in form factor that many products and/or devices are required to have. Another technique is to have the noise sensitive circuits on separate power supply lines (e.g., positive rail, negative rail, and/or return) and connected together off-chip. Other techniques include layout management, shielding, etc.

While each of these techniques provides varying levels of noise management, their effectiveness is reduced as the fabrication process of integrated circuit shrink and/or as more circuits are placed on the same integrated circuit die. Therefore, a need exists for an integrated circuit that reduces the adverse affects of noise.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
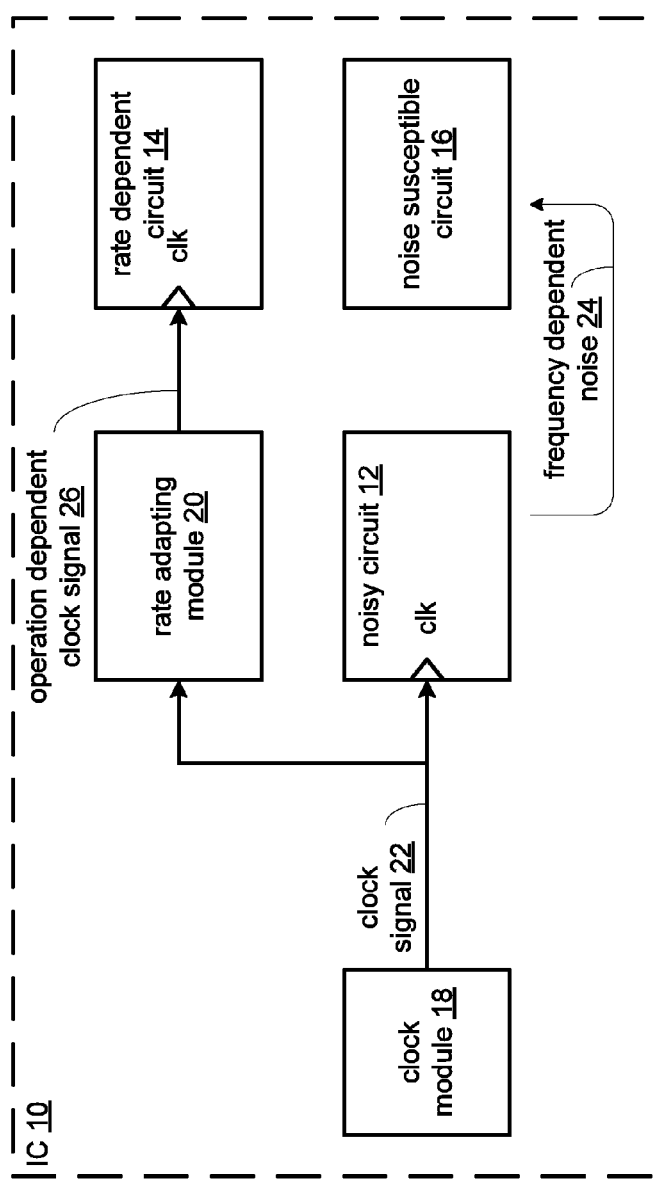
FIG. 1 is a schematic block diagram of an embodiment of an integrated circuit in accordance with the present invention.

FIG. 1 is a schematic block diagram of an embodiment of an integrated circuit (IC) 10 that includes a noisy circuit 12, a rate dependent circuit 14, a noise susceptible circuit 16, a clock module 18, and a rate adapting module 20. The circuits 12, 14, and 16 may be any type of analog and/or digital circuits that can be implemented on an integrated circuit including, but not limited to, amplifiers, memory, microprocessors, microcontrollers, baseband processing module, digital signal processors, digital logic circuitry, multipliers, adders, arithmetic logic units, analog to digital converters, digital to analog converters, sensors, impedance matching circuits, input-output circuits, state machines, mixers, and control logic.

The clock module 18, which may be a fractional-N frequency synthesizer, a direct digital frequency synthesizer, a phase locked loop, and/or any circuit that generates a sinusoidal or square wave repetitive signal at a desired rate, generates a clock signal 22. The noisy circuit 12 is clocked based on the clock signal 22 and when operating causes frequency dependent noise. For instance, the noisy circuit 12 may be clocked directly from the clock signal 22, a multiple of the clock signal 22, or a fraction of the clock 22 and causes frequency dependent noise 24 to be present in the IC 10. The frequency dependent noise 24, which may be harmonic signal components, spurs, and/or digital noise, may appear on the substrate of the IC 10, on the positive supply voltage rail, on negative supply voltage rail, and/or a voltage return rail.

The noise susceptible circuit 16 is susceptible to adverse performance when the frequency dependent noise 24 has a component within a given frequency range. The given frequency range may be associated with the bandwidth of signals processed by the noise susceptible circuit 16 and/or may be a range of operating frequencies of the noise susceptible circuit 16. To minimize the adverse performance of the noise susceptible circuit 16 due to the frequency dependent noise 24, the rate of the clock signal 22 is set such that components of the frequency dependent noise 24 associated with the clock signal 22 are outside the given frequency range.

The rate dependent circuit 14 requires a specific clock rate (which may be at a different rate than that of the clock signal 22) to perform one or more of its functions is clocked based on an operation dependent clock signal 26. The rate adapting module 20, which may be a fractional-N frequency synthesizer, a direct digital frequency synthesizer, a phase locked loop, and/or digital logic circuitry (e.g., a digital delay line to produce a plurality of delayed clock signals from the clock signal 22, a plurality of inverters to produce a plurality of inverted delayed clock signals, a multiplexer to select one of the plurality of delayed or inverted delayed clock signals to clock a D flip-flop), is coupled to produce the operation dependent clock signal 26 from the clock signal 22.

In one embodiment, the rate adapting module 20 establishes the operational dependent clock signal 26 by establishing an adjustment factor based on the rate dependency of the rate dependent circuit 14 and the clock signal 22. For example, if the rate dependency of the rate dependent circuit 14 is 100 MHz and the clock signal 22 has a rate of 105 MHz, the adjustment factor is 100/105. Having established the adjustment factor, the rate adapting module 20 adjusts the rate of the clock signal 22 based on the adjustment factor to produce the operation dependent clock signal 26.

In one embodiment, the clock module 18 determines whether components of the frequency dependent noise 24 are within the given frequency range for an initial rate of the clock signal 22. The initial rate of the clock signal 22 may be set at desired rate for the rate dependent circuit 14, a multiple thereof, and/or a fraction thereof. Note that the determining may be done by calculating frequency of the components of the frequency dependent noise 24 based on the initial clock rate. Alternatively, the IC 10 may be operated in a test mode at the initial rate of the clock signal 22 and monitoring performance of the noise susceptible circuit 16. If noise susceptible circuit 16 experiences minimal adverse affects due to the frequency dependent noise 24 then it can be assumed that there are no significant components of the frequency dependent noise in the given frequency range.

When the frequency dependent noise components are within the given frequency range, the clock module 18 adjusts the rate of the clock signal 22 such that the frequency dependent noise components associated with the clock signal 22 are outside the given frequency range. In one embodiment, the clock module 18 adjusts the rate of the clock signal 22 by calculation. For instance, if the given frequency range is from 960 MHz to 1040 MHz, and the initial rate of the clock is 100 MHz, the tenth harmonic of the clock signal 22 is 1000 MHz and is within the given frequency range. As such, the clock module 18 determines that a clock rate of 105 MHz produces a ninth harmonic at 945 MHz and a tenth harmonic at 1050 MHz, both of which are outside of the given frequency range. Alternatively, the clock module 18 may use a clock rate of 95 MHz, which has a tenth harmonic at 950 MHz and an eleventh harmonic at 1045 MHz, both of which are outside the given frequency range.

In another embodiment, the clock module 18 may incrementally increase or decrease the rate of the clock signal 22 during a test mode, where the IC 10 monitors for adverse performance of the noise susceptible circuit 14 due to the frequency dependent noise 24. When an acceptable level of performance is obtained for a given rate of the clock signal, it is used for the clock signal 22. Note that in any of the embodiments of FIGS. 1-8, an interpolating and/or anti-aliasing filter may be required between the noisy circuit and the rate dependent circuit if the noisy circuit and rate dependent circuit are coupled in a series fashion.

Figure 2:
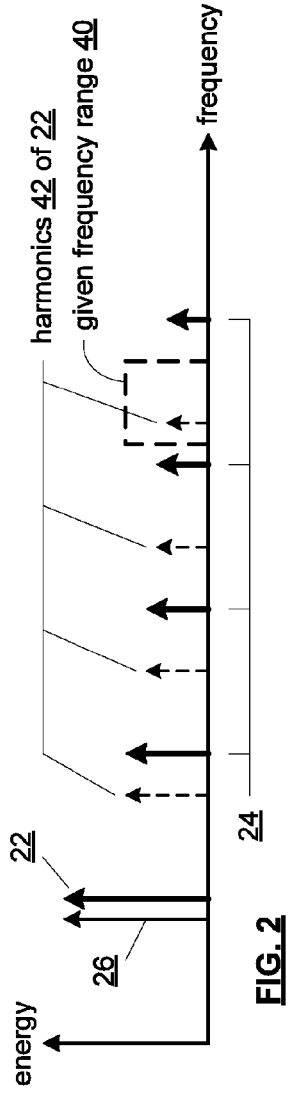
FIG. 2 is a frequency diagram of clock adjusting in accordance with the present invention.

FIG. 2 is a frequency diagram of an example of clock adjusting within the IC 10 of FIG. 1. In this illustration, the fundamental frequency of the operation dependent clock signal 26 includes harmonics 42 that are illustrated using dashed lines. If this rate were used for the clock signal 22, then there would be a harmonic within the given frequency range 40, which might adversely affect the performance of the noise susceptible circuit. As such, the rate of the clock signal 22 is adjusted such that the fundamental frequency of the clock signal 22 is greater than or less than (shown as greater than) the rate of the operation dependent clock signal 26. By adjusting the rate of the clock signal 22, its harmonic components are also adjusted and can be adjusted to be outside the given frequency range 40. However, the rate dependent circuit 14 requires a clock based on the operation dependent clock signal 25, which is derived from the clock signal 22 by the rate adapting module.

Figure 3:
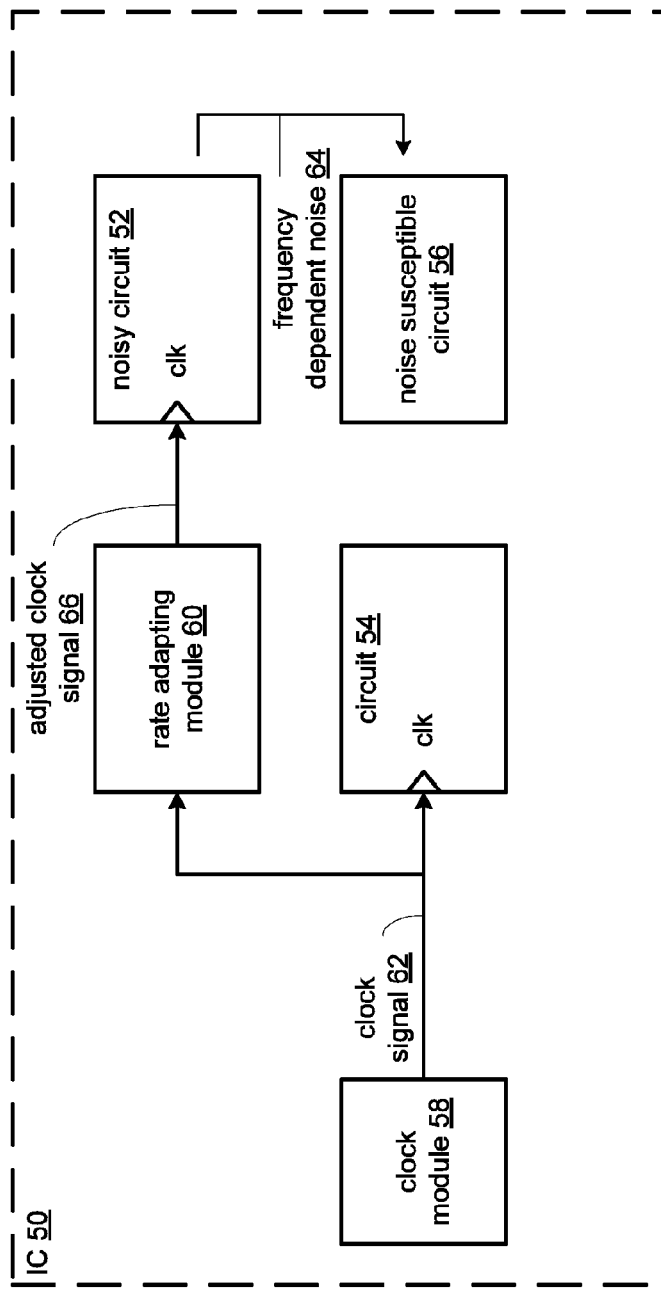
FIG. 3 is a schematic block diagram of another embodiment of an integrated circuit in accordance with the present invention.

FIG. 3 is a schematic block diagram of another embodiment of an integrated circuit (IC) 50 that includes a noisy circuit 52, a circuit 54, a noise susceptible circuit 56, a clock module 58, and a rate adapting module 60. The circuits 52, 54, and 56 may be any type of analog and/or digital circuits that can be implemented on an integrated circuit including, but not limited to, amplifiers, memory, microprocessors, microcontrollers, digital signal processors, baseband processing module, digital logic circuitry, multipliers, adders, arithmetic logic units, analog to digital converters, digital to analog converters, sensors, impedance matching circuits, input-output circuits, state machines, mixers, and control logic.

The clock module 58, which may be a fractional-N frequency synthesizer, a direct digital frequency synthesizer, a phase locked loop, and/or any circuit that generates a sinusoidal or square wave repetitive signal at a desired rate, generates a clock signal 62. The clock module 18 provides the clock signal 62, a multiple thereof, or a fraction thereof to the circuit 54, which requires a specific clock rate to perform one or more of its functions. Accordingly, the clock module 62 sets the rate of the clock signal 62 to provide the desired clock for the circuit 54. However, if the clock signal 62 were used to clock the noisy circuit 52, frequency dependent noise 64 would be within a given frequency range of the noise susceptible circuit 56.

The noise susceptible circuit 56 is susceptible to adverse performance when the frequency dependent noise 64 has a component within a given frequency range. The given frequency range may be associated with the bandwidth of signals processed by the noise susceptible circuit 56 and/or may be a range of operating frequencies of the noise susceptible circuit 56. To minimize the adverse performance of the noise susceptible circuit 56 due to the frequency dependent noise 64, the rate of the adjusted clock signal 66 is set such that frequency dependent noise 64 associated with the adjusted clock signal 66 is outside the given frequency range.

To move the frequency dependent noise 64 outside of the given frequency range, the rate adapting module 60, which may be a fractional-N frequency synthesizer, a direct digital frequency synthesizer, a phase locked loop, and/or digital logic circuitry (e.g., a digital delay line to produce a plurality of delayed clock signals from the clock signal 62, a plurality of inverters to produce a plurality of inverted delayed clock signals, a multiplexer to select one of the plurality of delayed or inverted delayed clock signals to clock a D flip-flop), is coupled to produce the adjusted clock signal 66 from the clock signal 62. The rate adapting module 60 provides the adjusted clock signal to the noisy circuit 52.

The noisy circuit 12 is clocked based on the adjusted clock signal 66 and when operating causes frequency dependent noise 64. For instance, the noisy circuit 52 may be clocked directly from the adjusted clock signal 66, a multiple of the adjusted clock signal 66, or a fraction of the adjusted clock signal 66 and causes frequency dependent noise 64 to be present in the IC 10. The frequency dependent noise 64, which may be harmonic signal components, spurs, and/or digital noise, may appear on the substrate of the IC 50, on the positive supply voltage rail, on negative supply voltage rail, and/or a voltage return rail.

In one embodiment, the rate adapting module 60 establishes the adjusted clock signal 66 by establishing an adjustment factor based on the given frequency range and the clock signal 62. For example, if the given frequency range is 960 MHz to 1040 MHz and the rate of the clock signal 62 is 100 MHz, then the clock signal has a tenth harmonic at 1000 MHz. The rate adapting module 60 may then determine the adjustment factor as 960/1000 or 1040/1000. Having established the adjustment factor, the rate adapting module 60 adjusts the rate of the clock signal 62 based on the adjustment factor to produce the adjusted clock signal 66.

In one embodiment, the rate adapting module 60 determines whether components of the frequency dependent noise 64 are within the given frequency range for the clock signal 62. Note that the determining may be done by calculating frequency of the components of the frequency dependent noise 64 based on the clock rate. Alternatively, the IC 50 may be operated in a test mode at the rate of the clock signal 22 and monitoring performance of the noise susceptible circuit 56. If noise susceptible circuit 56 experiences minimal adverse affects due to the frequency dependent noise 64 then it can be assumed that there are no significant components of the frequency dependent noise in the given frequency range.

When the frequency dependent noise components are within the given frequency range, the rate adapting module 60 adjusts the rate of the clock signal 62 such that the frequency dependent noise components associated with the adjusted clock signal 66 are outside the given frequency range. In one embodiment, the rate adapting module 60 adjusts the rate of the clock signal 62 by calculation. For instance, if the given frequency range is from 960 MHz to 1040 MHz, and the rate of the clock is 100 MHz, the tenth harmonic of the clock signal 22 is 1000 MHz and is within the given frequency range. As such, the rate adapting module 60 determines that a clock rate of 105 MHz produces a ninth harmonic at 945 MHz and a tenth harmonic at 1050 MHz, both of which are outside of the given frequency range. Alternatively, the rate adapting module 60 may use a clock rate of 95 MHz, which has a tenth harmonic at 950 MHz and an eleventh harmonic at 1045 MHz, both of which are outside the given frequency range.

In another embodiment, the rate adapting module 60 may incrementally increase or decrease the rate of the adjusted clock signal 66 during a test mode, where the IC 50 monitors for adverse performance of the noise susceptible circuit 54 due to the frequency dependent noise 64. When an acceptable level of performance is obtained for a given rate of the adjusted clock signal, it is used for the adjusted clock signal 66.

Figure 4:
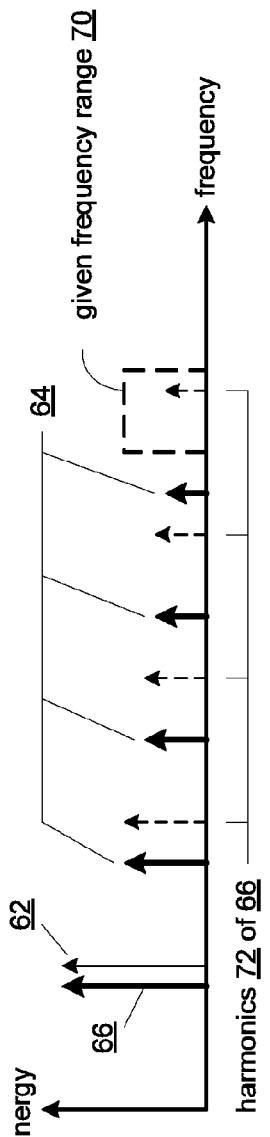
FIG. 4 is a frequency diagram of clock adjusting in accordance with the present invention.

FIG. 4 is a frequency diagram of an example of clock adjusting within the IC 50 of FIG. 3. In this illustration, the fundamental frequency of the clock signal 62 includes harmonics 42 that are illustrated using dashed lines. If this rate were used to clock the noisy circuit 52, then there would be a harmonic within the given frequency range 70, which might adversely affect the performance of the noise susceptible circuit 56. As such, the rate of the adjusted clock signal 66 is established such that its fundamental frequency is greater than or less than (shown as less than) the rate of the clock signal 62. By adjusting the rate of the adjusted clock signal 66, its harmonic components are also adjusted and can be adjusted to be outside the given frequency range 70.

Figure 5:
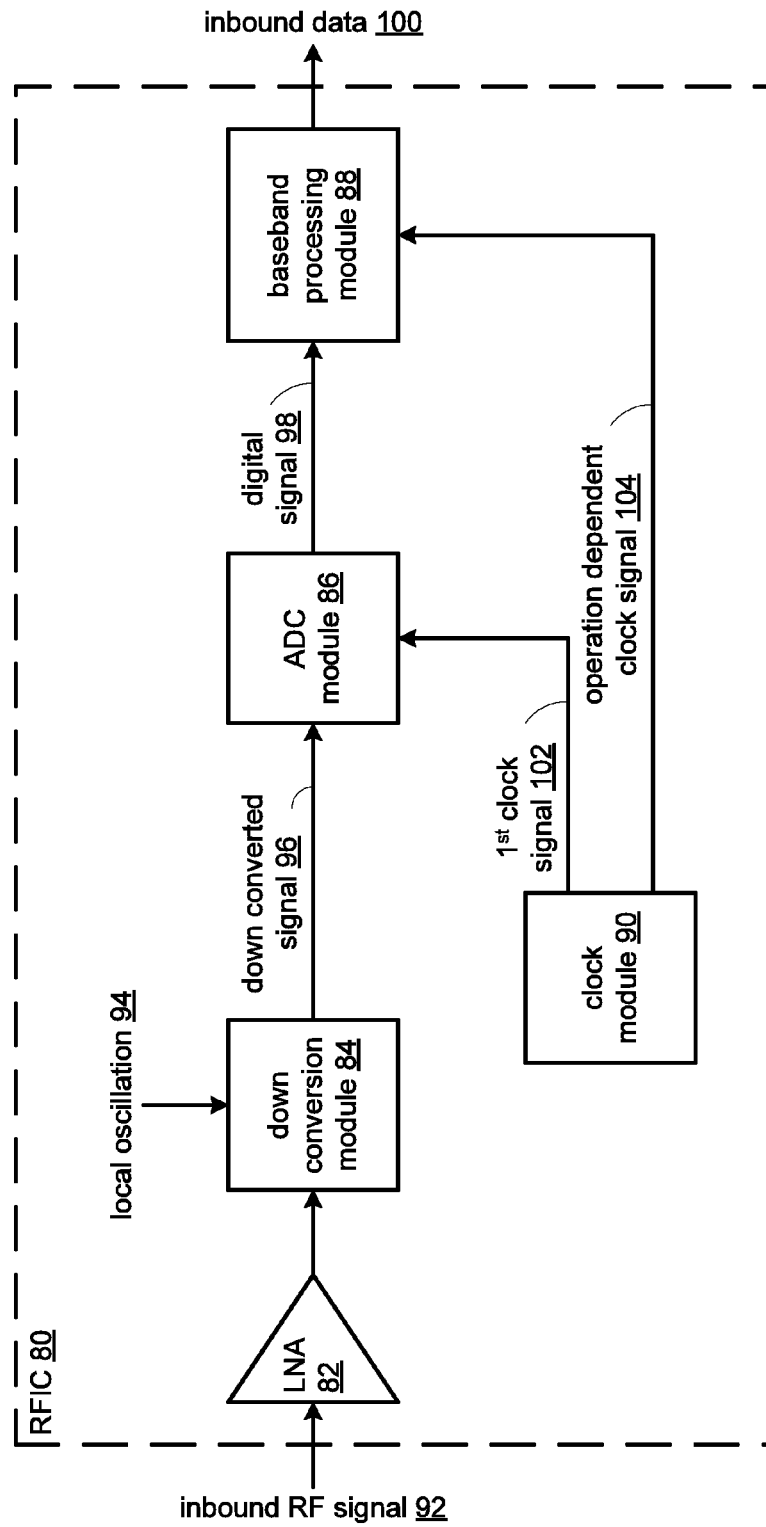
FIG. 5 is a schematic block diagram of an embodiment of a radio frequency integrated circuit in accordance with the present invention.

FIG. 5 is a schematic block diagram of an embodiment of a radio frequency integrated circuit (RFIC) 80 that includes a low noise amplifier 82, a down conversion module 84, an analog to digital converter module 86, a baseband processing module 88, and a clock module 90. The baseband processing module 88 executes digital receiver functions that include, but are not limited to, digital intermediate frequency to baseband conversion, demodulation, demapping, depuncturing, decoding, and/or descrambling. The baseband processing module 88 may be implemented using a processing device and may have associated memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 88 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

In operation, the RFIC 80 receives inbound RF signals 92 via an antenna, which were transmitted by a base station, an access point, or another wireless communication device. The antenna provides the inbound RF signals 92 to the low noise amplifier (LNA) 82, which amplifies the signals 92 to produce an amplified inbound RF signals. The conversion mixing module 84 converts the amplified inbound RF signals into a down converted signal 96, which may be an intermediate frequency or be at baseband, based on a local oscillation module 94.

The analog-to-digital converter module 86 converts the down converted signal 96 from the analog domain to the digital domain to produce a digital signal 98. The baseband processing module 88 decodes, descrambles, demaps, deframing, and/or demodulates the digital signal 98 to recapture inbound data 100 in accordance with a particular wireless communication standard being implemented by the RFIC 80. Note that an interpolating and/or anti-aliasing filter may be required between the ADC module 86 and the baseband processing module 88, where the interpolating and/or anti-aliasing filter is clocked at a rate based on the operation dependent clock signal 104. Further note that each function of the baseband processing module 88 may be clocked from the same clock, different clocks, or a combination thereof. As such, the operation dependent clock signal 104 may include one or more clock signals.

In this embodiment, the clock module 90 generates a first clock signal 102 and an operation dependent clock signal 104 such that the rate of the first clock signal 102 is set such that frequency dependent noise components associated with the first clock signal 102 are outside a frequency band associated with the inbound RF signal 92 and the rate of the operation dependent clock signal 104 is set based on processing specifications of the digital signal 98. The processing specifications include rates for one or more of framing, demapping, deinterleave, IFFT, decoding, descramble, etc.

The ADC module 86 is clocked by the first clock signal 102 and generates frequency dependent noise that may be present in the RFIC 80. The frequency dependent noise, which may be harmonic signal components, spurs, and/or digital noise, may appear on the substrate of the IC 80, on the positive supply voltage rail, on negative supply voltage rail, and/or on a voltage return rail. The baseband processing module 88 is clocked by the operation dependent clock 104 to produce the inbound data 100 from the digital signal 98. In this manner, the frequency dependent noise components produced by the digital portion of the ADC module 86 do not adversely interfere with the LNA's 82 amplifying of the inbound RF signal 92 and yet the baseband processing module 88 is clocked at a rate required to recover the inbound data 100.

As one of ordinary skill in the art will appreciate, buffering may be required between noisy circuits and operation rate dependent circuits to compensate for the different clocking rates. Alternatively, the clock module and/or the rate adapting module may include a sample rate converter to accommodate the differences in clocking rates.

Figure 6:
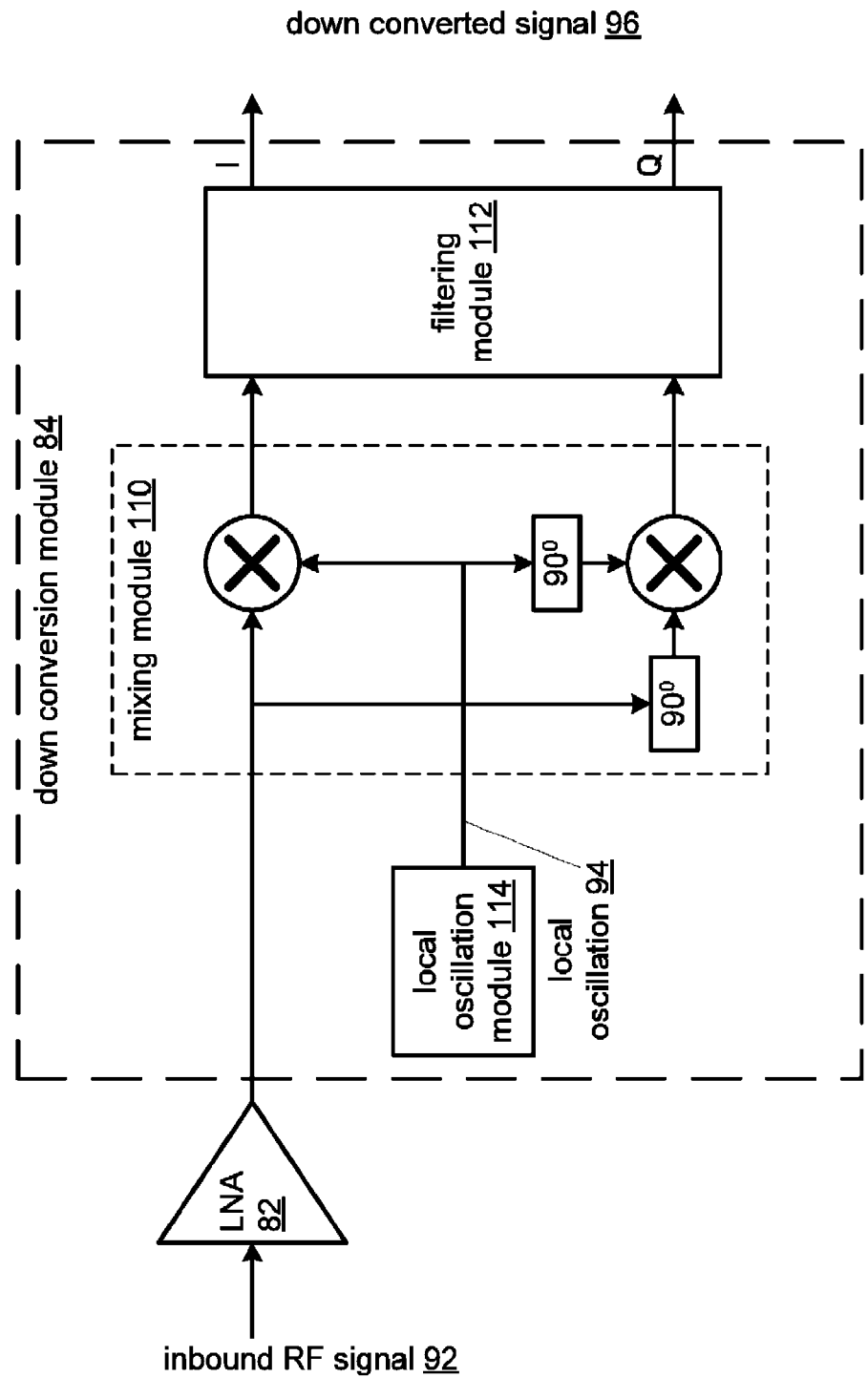
FIG. 6 is a schematic block diagram of an embodiment of a down conversion module in accordance with the present invention.

FIG. 6 is a schematic block diagram of an embodiment of a down conversion module 84 that includes a local oscillation module 114, a mixing module 110, and a filtering module 112. The mixing module 110 includes a pair of mixers and a pair of 90° phase shift modules. The first mixer mixes the amplified inbound RF signal 92 with the local oscillation 94 to produce a first mixed signal. The second mixer mixes a 90° phase shifted version of the amplified inbound RF signal 92 with a 90° phase shifted version of the local oscillation 94 to produce a second mixed signal.

The filtering module 112 filters out higher frequency components of the first and second mixed signals to produce an in-phase component and a quadrature component of the down converted signal 96. Note that to process the in-phase component and a quadrature component of the down converted signal 96, the ADC module 86 would include two ADCs; one for each signal component.

Figure 7:
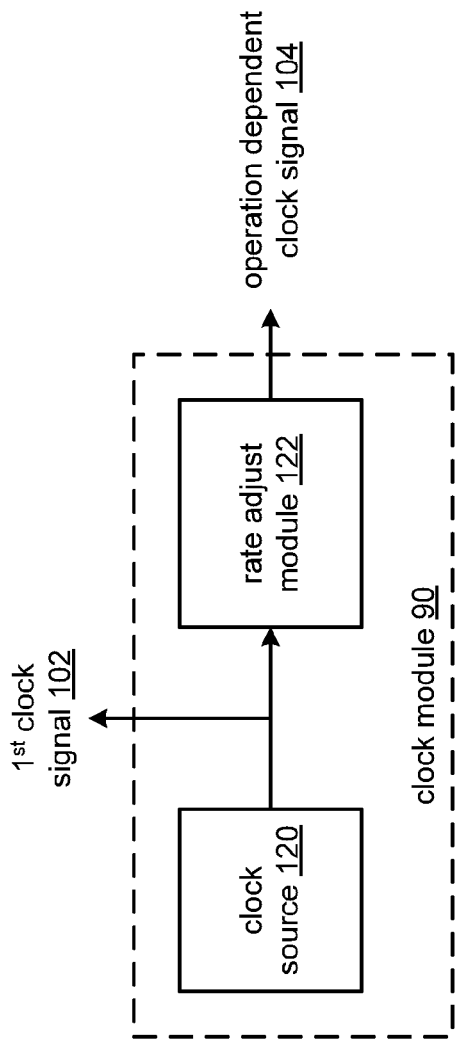
FIG. 7 is a schematic block diagram of an embodiment of a clock module in accordance with the present invention.

FIG. 7 is a schematic block diagram of an embodiment of a clock module 90 that includes a clock source 120 and a rate adjust module 122. The clock source 120, which may be a fractional-N frequency synthesizer, a direct digital frequency synthesizer, a phase locked loop, generates the first clock signal 102.

The rate adjust module 122, which may be a fractional-N frequency synthesizer, a direct digital frequency synthesizer, a phase locked loop, and/or digital logic circuitry (e.g., a digital delay line to produce a plurality of delayed clock signals from the clock signal 62, a plurality of inverters to produce a plurality of inverted delayed clock signals, a multiplexer to select one of the plurality of delayed or inverted delayed clock signals to clock a D flip-flop), generates the operation dependent clock 104 from the first clock signal 102.

In one embodiment, the clock source 120 determines whether components of the frequency dependent noise are within the given frequency range of the inbound RF signal. Note that the determining may be done by calculating frequency of the components of the frequency dependent noise based on an initial setting of the first clock signal 102 and the given frequency range. Alternatively, the RFIC 80 may be operated in a test mode at the initial rate of the first clock signal 102 and monitoring performance of the LNA 82. If LNA 82 experiences minimal adverse affects due to the frequency dependent noise then it can be assumed that there are no significant components of the frequency dependent noise in the given frequency range.

When the frequency dependent noise components are within the given frequency range, the clock source 120 adjusts the rate of the first clock signal 102 such that the frequency dependent noise components associated with the first clock signal 102 are outside the given frequency range. In one embodiment, the clock source 120 adjusts the rate of the first clock signal 102 by calculation. For instance, if the given frequency range is from 960 MHz to 1040 MHz, and the initial rate of the first clock is 100 MHz, the tenth harmonic of the first clock signal 102 is 1000 MHz and is within the given frequency range. As such, the clock source 120 determines that a clock rate of 105 MHz produces a ninth harmonic at 945 MHz and a tenth harmonic at 1050 MHz, both of which are outside of the given frequency range. Alternatively, the clock source 120 may use a clock rate of 95 MHz, which has a tenth harmonic at 950 MHz and an eleventh harmonic at 1045 MHz, both of which are outside the given frequency range.

In another embodiment, the clock source 120 may incrementally increase or decrease the rate of the first clock signal 102 during a test mode, where the RFIC 80 monitors for adverse performance of the LNA 82 due to the frequency dependent noise. When an acceptable level of performance is obtained for a given rate of the first clock signal, it is used for the first clock signal 102.

Figure 8:
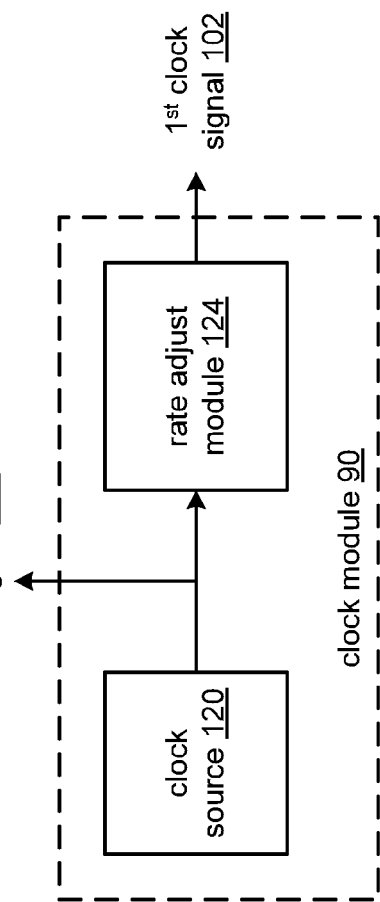
FIG. 8 is a schematic block diagram of another embodiment of a clock module in accordance with the present invention.

FIG. 8 is a schematic block diagram of another embodiment of a clock module 90 that includes the clock source 120 and a rate adjust module 124. The clock source 120, which may be a fractional-N frequency synthesizer, a direct digital frequency synthesizer, a phase locked loop, generates the operation dependent clock signal 104.

The rate adjust module 124, which may be a fractional-N frequency synthesizer, a direct digital frequency synthesizer, a phase locked loop, and/or digital logic circuitry (e.g., a digital delay line to produce a plurality of delayed clock signals from the clock signal 62, a plurality of inverters to produce a plurality of inverted delayed clock signals, a multiplexer to select one of the plurality of delayed or inverted delayed clock signals to clock a D flip-flop), generates the first clock signal 102 from the operation dependent clock signal 104.

In one embodiment, the rate adjust module 124 establishes the first clock signal 102 by establishing an adjustment factor based on the given frequency range and the operation dependent clock signal 104. For example, if the given frequency range is 960 MHz to 1040 MHz and the rate of the operation dependent clock signal 104 is 100 MHz, then the operation dependent clock signal has a tenth harmonic at 1000 MHz. The rate adjust module 124 may then determine the adjustment factor as 960/1000 or 1040/1000. Having established the adjustment factor, the rate adjust module 124 adjusts the rate of the operation dependent clock signal 104 based on the adjustment factor to produce the first clock signal 102.

In one embodiment, the rate adjust module 124 determines whether components of the frequency dependent noise are within the given frequency range. Note that the determining may be done by calculating frequency of the components of the frequency dependent noise based on the clock rate. Alternatively, the RFIC 80 may be operated in a test mode at the rate of the operation dependent clock signal 104 and monitoring performance of the LNA 82. If LNA 82 experiences minimal adverse affects due to the frequency dependent noise then it can be assumed that there are no significant components of the frequency dependent noise in the given frequency range.

When the frequency dependent noise components are within the given frequency range, the rate adjust module 124 adjusts the rate of the first clock signal 102 such that the frequency dependent noise components associated with the first clock signal 102 are outside the given frequency range. In one embodiment, the rate adjust module 124 adjusts the rate of the operation dependent clock signal 104 by calculation. For instance, if the given frequency range is from 960 MHz to 1040 MHz, and the rate of the operation dependent clock is 100 MHz, the tenth harmonic of the operation dependent clock signal 104 is 1000 MHz and is within the given frequency range. As such, the rate adjust module 124 determines that a clock rate of 105 MHz produces a ninth harmonic at 945 MHz and a tenth harmonic at 1050 MHz, both of which are outside of the given frequency range. Alternatively, the rate adjust module 124 may use a clock rate of 95 MHz, which has a tenth harmonic at 950 MHz and an eleventh harmonic at 1045 MHz, both of which are outside the given frequency range.

In another embodiment, the rate adjust module 124 may incrementally increase or decrease the rate of the first clock signal 102 during a test mode, where the RFIC 80 monitors for adverse performance of the LNA 82 due to the frequency dependent noise. When an acceptable level of performance is obtained for a given rate of the first clock signal, it is used for the first clock signal 102.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An apparatus, comprising:
   a clock source that generates a first clock signal for clocking a first clocked module, the first clock signal having a rate such that frequency dependent noise components associated with the first clock signal are outside a given frequency range that causes adverse performance in a noise susceptible module; and
   a rate adapting module that produces an operation dependent clock signal from the first clock signal for clocking a second clocked module that is rate dependent;
   wherein the rate adapting module further functions to:
      establish an adjustment factor based on the rate dependency of the second clocked module and the first clock signal; and
      adjust the rate of the first clock signal based on the adjustment factor to produce the operation dependent clock signal.

2. The apparatus of claim 1, wherein the first clocked module causes the frequency dependent noise components.

3. The apparatus of claim 2, further comprising:
   a filter coupled between the second clocked module and the first clocked module, the filter being clocked based on the operation dependent clock signal.

4. The apparatus of claim 2, wherein the noise susceptible module is a low noise amplifier, the second clocked module is a baseband processing module and the first clocked module is an analog to digital conversion (ADC) module; and wherein a digital portion of the ADC module is clocked based on the first clock signal.

5. The apparatus of claim 4, wherein the baseband processing module operates to convert an inbound digital signal into inbound data; and wherein a rate of the operation dependent clock signal is set based on processing specifications of the digital signal.

6. The apparatus of claim 1, wherein the rate adapting module comprises at least one of:
a fractional-N frequency synthesizer;
direct digital frequency synthesizer;
a phase locked loop; and
digital logic circuitry.

7. The apparatus of claim 1, wherein the clock source further functions to:
for an initial rate of the first clock signal, determine whether the frequency dependent noise components are within the given frequency range; and
when the frequency dependent noise components are within the given frequency range, adjust the rate of the first clock signal by calculation such that the frequency dependent noise components associated with the first clock signal are outside the given frequency range.

8. The apparatus of claim 1, wherein the clock source further functions to:
determine whether the frequency dependent noise components are within the given frequency range; and
when the frequency dependent noise components are within the given frequency range, incrementally adjust a rate of the first clock signal such that the frequency dependent noise components associated with the first clock signal are outside the given frequency range.

9. The apparatus of claim 1, wherein the frequency dependent noise comprises at least one of:
harmonic signal components;
spurs; and
digital noise.

10. A radio frequency device, comprising:
a clock module that generates a first clock signal having a rate such that frequency dependent noise components associated with the first clock signal are outside a given frequency range, the clock module further producing an operation dependent clock signal from the first clock signal;
a low noise amplifier that is susceptible to adverse performance when the frequency dependent noise components are within the given frequency range; and
a baseband processing module having at least one function that is rate dependent and clocked based on the operation dependent clock signal;
wherein the clock module further functions to:
establish an adjustment factor based on the rate dependency of the baseband processing module and the first clock signal; and
adjust the rate of the first clock signal based on the adjustment factor to produce the operation dependent clock signal.

11. The radio frequency device of claim 10, wherein the baseband processing module operates to convert an inbound digital signal into inbound data; and wherein a rate of the operation dependent clock signal is set based on processing specifications of the digital signal.

12. The radio frequency device of claim 10, further comprising:
an analog to digital conversion (ADC) module that causes frequency dependent noise, wherein a digital portion of the ADC module is clocked based on the first clock signal.

13. The radio frequency device of claim 12, further comprising:
a filter coupled between the baseband processing module and the ADC conversion module, the filter being clocked based on the operation dependent clock signal.

14. The radio frequency device of claim 10, wherein the clock module further functions to:
for an initial rate of the first clock signal, determine whether the frequency dependent noise components are within the given frequency range; and
when the frequency dependent noise components are within the given frequency range, adjust the rate of the first clock signal by calculation such that the frequency dependent noise components associated with the first clock signal are outside the given frequency range.

15. The radio frequency device of claim 10, wherein the clock module further functions to:
determine whether the frequency dependent noise components are within the given frequency range; and
when the frequency dependent noise components are within the given frequency range, incrementally adjust a rate of the first clock signal such that the frequency dependent noise components associated with the first clock signal are outside the given frequency range.

16. The radio frequency device of claim 10, wherein the clock module comprises at least one of:
a fractional-N frequency synthesizer;
direct digital frequency synthesizer;
a phase locked loop; and
digital logic circuitry.

17. The radio frequency device of claim 10, wherein the frequency dependent noise comprises at least one of:
harmonic signal components;
spurs; and
digital noise.

18. A method for clocking an apparatus, comprising:
generating a first clock signal for clocking a first clocked module, the first clock signal having a rate such that frequency dependent noise components associated with the first clock signal are outside a given frequency range that causes adverse performance in a noise susceptible module; and
producing an operation dependent clock signal from the first clock signal for clocking a second clocked module that is rate dependent; wherein producing the operation dependent clock signal further includes:
establishing an adjustment factor based on the rate dependency of the second clocked module and the first clock signal; and
adjusting the rate of the first clock signal based on the adjustment factor to produce the operation dependent clock signal.

19. The method of claim 18, wherein generating the first clock signal further comprises:
determining whether the frequency dependent noise components are within the given frequency range; and
when the frequency dependent noise components are within the given frequency range, adjusting the rate of the first clock signal such that the frequency dependent noise components associated with the first clock signal are outside the given frequency range.

20. The method of claim 18, wherein generating the first clock signal further comprises:
determining whether the frequency dependent noise components are within the given frequency range; and
when the frequency dependent noise components are within the given frequency range, incrementally adjusting a rate of the first clock signal such that the frequency dependent noise components associated with the first clock signal are outside the given frequency range.

* * * * *